United States Patent
Matters et al.

(10) Patent No.: US 10,379,893 B2
(45) Date of Patent: Aug. 13, 2019

(54) CONTAINER SYNCHRONIZATION

(71) Applicant: RACKWARE, INC., Fremont, CA (US)

(72) Inventors: Todd Matters, Royersford, PA (US); Aniket Kulkarni, Maharashtra (IN); Dan Moulding, Salt Lake City, UT (US); Sash Sunkara, Dublin, CA (US); Mikhail Zhidko, San Jose, CA (US)

(73) Assignee: RACKWARE, INC., Fremont, CA (US)

( * ) Notice: Subject to any disclaimer, the term of this patent is extended or adjusted under 35 U.S.C. 154(b) by 288 days.

(21) Appl. No.: 15/233,593

(22) Filed: Aug. 10, 2016

(65) Prior Publication Data

US 2018/0046487 A1    Feb. 15, 2018

(51) Int. Cl.
*G06F 9/455* (2018.01)
*G06F 16/178* (2019.01)

(52) U.S. Cl.
CPC ........ *G06F 9/45558* (2013.01); *G06F 16/178* (2019.01); *G06F 2009/45562* (2013.01)

(58) Field of Classification Search
CPC . H04L 29/0854; G06F 17/30578; G06F 9/451
USPC ......................................... 707/610; 370/503
See application file for complete search history.

(56) References Cited

U.S. PATENT DOCUMENTS

| | | | |
|---|---|---|---|
| 8,069,190 B2 | 11/2011 | McColl et al. | |
| 8,175,863 B1 | 5/2012 | Ostermeyer et al. | |
| 8,468,455 B2 | 6/2013 | Jorgensen et al. | |
| 8,505,003 B2 | 8/2013 | Bowen | |
| 8,909,767 B2 | 12/2014 | Sunkara et al. | |
| 2005/0147130 A1* | 7/2005 | Hurwitz ............ | G06F 17/30578 370/503 |
| 2007/0214456 A1 | 9/2007 | Casey et al. | |
| 2007/0250410 A1 | 10/2007 | Brignone et al. | |
| 2008/0155223 A1 | 6/2008 | Hiltgen et al. | |
| 2009/0210527 A1 | 8/2009 | Kawato | |
| 2009/0222461 A1 | 9/2009 | Alpern et al. | |
| 2010/0110634 A1 | 5/2010 | Woodbury et al. | |
| 2010/0185828 A1 | 7/2010 | Kano | |
| 2010/0198972 A1 | 8/2010 | Umbehocker | |
| 2010/0235654 A1 | 9/2010 | Malik et al. | |

(Continued)

FOREIGN PATENT DOCUMENTS

| | | |
|---|---|---|
| JP | 2008225546 | 9/2008 |
| JP | 2009140053 | 6/2009 |
| WO | 2010080214 | 7/2010 |

*Primary Examiner* — Eric C Wai
(74) *Attorney, Agent, or Firm* — Kunzler Bean & Adamson

(57) ABSTRACT

Apparatuses, methods, systems, and computer program products are disclosed for container synchronization. Host data associated with a first container on a host device is determined. Target data associated with a second container on a target device is determined. Differences between the host data associated with the first container on the host device and the target data associated with the second container on the target device are determined. Host data associated with the first container on the host device is synchronized with target data associated with the second container on the target device in response to determining differences between the host data and the target data such that the host data associated with the first container is identical to the target data associated with the second container.

20 Claims, 7 Drawing Sheets

(56) References Cited

U.S. PATENT DOCUMENTS

| | | |
|---|---|---|
| 2011/0209064 A1 | 8/2011 | Jorgensen et al. |
| 2012/0011254 A1 | 1/2012 | Jamjoom et al. |
| 2014/0201137 A1* | 7/2014 | Vibhor ................ H04L 29/0854 707/610 |
| 2017/0293674 A1* | 10/2017 | De La Riviere ........ G06F 9/451 |
| 2017/0366455 A1* | 12/2017 | Pongracz ................ H04L 45/66 |

* cited by examiner

CONTAINER SYNCHRONIZATION

FIELD

This invention relates to container virtualization and more particularly relates to synchronizing data between containers.

BACKGROUND

In computing, virtualization is an emulation of a particular computer system. Various methods exist to virtualize computer systems. One virtualization method utilizes a hypervisor to share and manage hardware, allowing multiple different environments, isolated from each other, to be executed on the same physical machine. Another method utilizes operating-system containers to allow the resources of a computer system to be partitioned using a kernel's support for multiple isolated user space instances.

SUMMARY

The subject matter of the present application has been developed in response to the present state of the art, and in particular, in response to the problem of, and the need to, synchronize containers, that have not yet been fully solved by currently available techniques. Accordingly, the subject matter of the present application has been developed to synchronize containers that overcomes at least some of the above-discussed shortcomings of prior art techniques.

A method, for synchronizing containers is disclosed and includes determining host data associated with a first container on a host device. The method further includes determining target data associated with a second container on a target device. The method also includes determining differences between the host data associated with the first container on the host device and the target data associated with the second container on the target device. The method includes synchronizing the host data associated with the first container on the host device with the target data associated with the second container on the target device in response to determining differences between the host data and the target data such that the host data associated with the first container is identical to the target data associated with the second container. The preceding subject matter of this paragraph characterizes example 1 of the present disclosure.

The method further includes determining one or more synchronization policies for the host data. A synchronization policy defines one or more synchronization settings for a container. The one or more synchronization settings comprises one or more of a synchronization frequency for the host data, a synchronization schedule for the host data, one or more synchronization methods for the host data, and one or more target devices to which the host data is synchronized. The preceding subject matter of this paragraph characterizes example 2 of the present disclosure, wherein example 2 also includes the subject matter according to example 1, above.

Additionally, the method includes assigning a synchronization policy to the first container such that the one or more synchronization settings of the synchronization policy are applied to all host data associated with the first container. The preceding subject matter of this paragraph characterizes example 3 of the present disclosure, wherein example 3 also includes the subject matter according to any one of examples 1 or 2, above.

The method also includes assigning a synchronization policy to specific host data associated with the first container such that the specific host data associated with the first container is synchronized according to the assigned synchronization policy while different host data associated with the first container is synchronized according to a different synchronization policy. The preceding subject matter of this paragraph characterizes example 4 of the present disclosure, wherein example 4 also includes the subject matter according to any one of examples 1-3, above.

A synchronization policy specifies host data associated with the first container that is excluded from being synchronized with the target device. The preceding subject matter of this paragraph characterizes example 5 of the present disclosure, wherein example 5 also includes the subject matter according to any one of examples 1-4, above.

The method includes assigning a plurality of synchronization policies to one or more of the first container and the host data associated with the first container. The preceding subject matter of this paragraph characterizes example 6 of the present disclosure, wherein example 6 also includes the subject matter according to any one of examples 1-5, above.

Additionally, the method includes determining a priority for each of the plurality of synchronization policies. The method also includes synchronizing the host data associated with the first container responsive to the priority for each of the plurality of synchronization policies. The preceding subject matter of this paragraph characterizes example 7 of the present disclosure, wherein example 7 also includes the subject matter according to any one of examples 1-6, above.

The host data is synchronized with the target data in a one-way synchronization relationship such that data changes present in the target data, but not in the host data, are overridden by the host data such that the target data mirrors the host data. The preceding subject matter of this paragraph characterizes example 8 of the present disclosure, wherein example 8 also includes the subject matter according to any one of examples 1-7, above.

The method includes rebooting the target device in response to the host data being synchronized with the target data. The preceding subject matter of this paragraph characterizes example 9 of the present disclosure, wherein example 9 also includes the subject matter according to any one of examples 1-8, above.

The target device executes a microkernel during synchronization of the host data with the target data. The preceding subject matter of this paragraph characterizes example 10 of the present disclosure, wherein example 10 also includes the subject matter according to any one of examples 1-9, above.

The method also includes synchronizing the host data with the target data in real-time. The preceding subject matter of this paragraph characterizes example 11 of the present disclosure, wherein example 11 also includes the subject matter according to any one of examples 1-10, above.

The host data associated with the first container comprises one or more of a file, a partition, a disk, a data block, a data sector, a byte, and a bit. The preceding subject matter of this paragraph characterizes example 12 of the present disclosure, wherein example 12 also includes the subject matter according to any one of examples 1-11, above.

An apparatus for synchronizing containers is disclosed. The apparatus includes a processor and a memory that stores code executable by the processor. The code is executable by the processor to determine host data associated with a first container on a host device. The code is further executable by the processor to determine target data associated with a second container on a target device. The code is also executable by the processor to determine differences between the host data associated with the first container on the host device and the target data associated with the second container on the target device. The code is executable by the processor to synchronize the host data associated with the first container on the host device with the target data associated with the second container on the target device in response to determining differences between the host data and the target data such that the host data associated with the first container is identical to the target data associated with the second container. The preceding subject matter of this paragraph characterizes example 13 of the present disclosure.

The code is additionally executable by the processor to determine one or more synchronization policies for the host data. A synchronization policy defines one or more synchronization settings for a container. The one or more synchronization settings comprises one or more of a synchronization frequency for the host data, a synchronization schedule for the host data, one or more synchronization methods for the host data, and one or more target devices to which the host data is synchronized. The preceding subject matter of this paragraph characterizes example 14 of the present disclosure, wherein example 14 also includes the subject matter according to example 13, above.

The code is also executable by the processor to assign a synchronization policy to the first container such that the one or more synchronization settings of the synchronization policy are applied to all host data associated with the first container. The code is further executable by the processor to assign a synchronization policy to specific host data associated with the first container such that the specific host data associated with the first container is synchronized according to the assigned synchronization policy while different host data associated with the first container is synchronized according to a different synchronization policy. The preceding subject matter of this paragraph characterizes example 15 of the present disclosure, wherein example 15 also includes the subject matter according to example 13-14, above.

A synchronization policy specifies host data associated with the first container that is excluded from being synchronized with the target device. The preceding subject matter of this paragraph characterizes example 16 of the present disclosure, wherein example 16 also includes the subject matter according to example 13-15, above.

The code is executable by the processor to assign a plurality of synchronization policies to one or more of the first container and the host data associated with the first container. The preceding subject matter of this paragraph characterizes example 17 of the present disclosure, wherein example 17 also includes the subject matter according to example 13-16, above.

The host data is synchronized with the target data in a one-way synchronization relationship such that data changes present in the target data, but not in the host data, are overridden by the host data such that the target data mirrors the host data. The preceding subject matter of this paragraph characterizes example 18 of the present disclosure, wherein example 18 also includes the subject matter according to example 13-17, above.

The code is further executable by the processor to synchronize the host data with the target data in real-time. The preceding subject matter of this paragraph characterizes example 19 of the present disclosure, wherein example 19 also includes the subject matter according to example 13-18, above.

A program product for synchronizing containers is disclosed. The program product includes a computer readable storage medium that stores code executable by a processor. The executable code includes code to perform determining host data associated with a first container on a host device. The executable code further includes code to perform determining target data associated with a second container on a target device. The executable code additionally includes code to perform determining differences between the host data associated with the first container on the host device and the target data associated with the second container on the target device. The executable code also includes code to perform synchronizing the host data associated with the first container on the host device with the target data associated with the second container on the target device in response to determining differences between the host data and the target data such that the host data associated with the first container is identical to the target data associated with the second container. The preceding subject matter of this paragraph characterizes example 20 of the present disclosure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
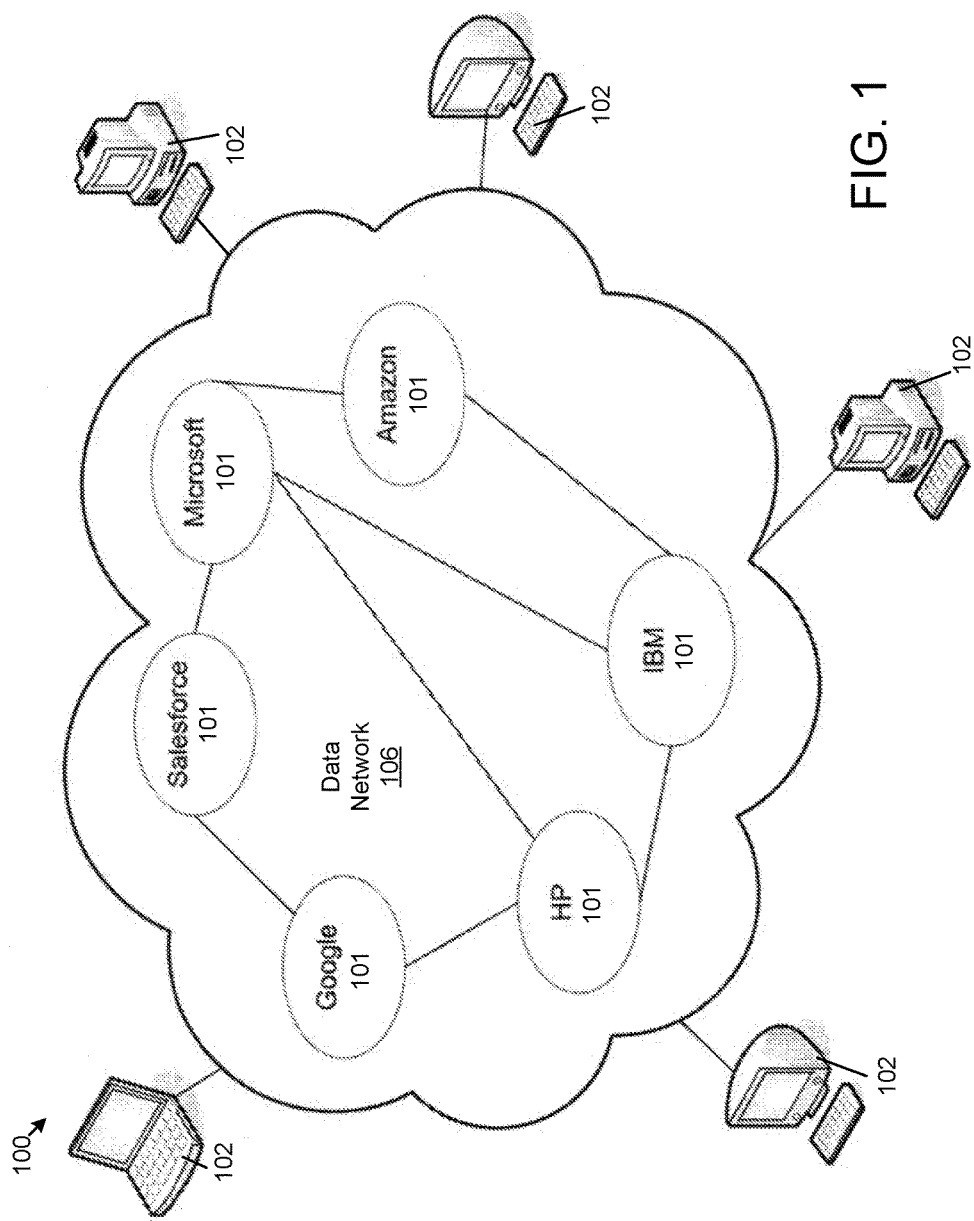
FIG. 1 is a schematic block diagram of one embodiment of a system for container synchronization.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

A hypervisor, also called virtual machine ("VM"), allows for the creation of a virtual computer or virtual system. It allows multiple operating systems on each VM to run concurrently on a host computer—a feature called hardware virtualization. Hypervisors present guest operating systems with a virtual platform and monitor the execution of the guest operating systems. In that way, multiple operating systems, including multiple instances of the same operating system, can share hardware resources. Historically, hypervisors provide the ability to consolidate many platforms with VMs. Because of this, several tools were developed to allow conversion between physical hardware resources and virtual hardware resources. However, hypervisors may experience difficulties regarding costs, network issues, disparate interfaces, and performance issues. Furthermore, many applications are not developed with hypervisors in mind. It may be difficult to plan which applications to consolidate onto a single hypervisor as application performance requirements vary over time.

In some embodiments, cloud computing is similar to the use of hypervisors, but provides an additional level of abstraction that solves many of the shortcomings of hypervisors. Cloud computing, as used herein, is Internet-based computing where shared or dedicated computing hardware resources, software, and information are provided to computers and other devices on demand. Cloud computing describes a consumption and delivery model for IT services involving over-the-Internet provision of resources that provides a layer of abstraction between users and the particular computer hardware being used. Cloud computing infrastructure services deliver computer infrastructure as a service. As such, users no longer need expertise in, or control over, the technology infrastructure that supports them. Rather than purchasing servers, software, data center storage space or network equipment, users can instead purchase those resources as a fully outsourced service on an on-demand basis. Cloud application services, referred to as "Software as a Service" (SaaS), deliver software over the Internet as a service, thus eliminating the need to install and run the application on a user's own systems. The service is typically billed on a utility computing basis based on the amount of resources consumed, where the costs generally reflect the level of activity or usage. Sharing computing resources among multiple organizations or users can improve utilization rates, since servers are not unnecessarily left idle for any extended period of time. This reduces costs significantly and can increase the speed of application development. A side-effect of this approach is that overall computer usage rises dramatically as users no longer have to engineer for peak load limits. In addition, increased high-speed bandwidth makes it possible to receive the same response times from centralized infrastructures at other sites.

Cloud computing frequently takes the form of web-based tools or applications that users can access and use through a web browser as if it were a program installed locally on their own computer. Typical cloud computing service providers deliver common business applications online that are accessed from another web service or software such as a web browser, while the software and data are stored remotely on the servers of the cloud computing service providers or "cloud service providers." One element of cloud computing is customization and the creation of a user-defined experience. Most cloud computing infrastructures consist of services delivered through common centers and built on servers. Clouds often appear as single points of access for all computing needs. Commercial offerings are generally expected to meet quality of service requirements, and typically include service level agreements.

FIG. 1 depicts an example diagram of a cloud computing environment 100. In the illustrated embodiment, various local user cloud client computers 102 are interconnected to one another over a data network 106 through the exemplary cloud service providers 101. Some major cloud service providers include Microsoft, Salesforce.com, HP, IBM, Amazon, and Google.

In one embodiment, the system 100 includes one or more information handling devices 102 or cloud client devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. An information handling device 102, in one embodiment, may comprise computer hardware or software that utilizes cloud computing for application delivery, or that is specifically designed for delivery of cloud services.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

A "public cloud," as used herein, is defined as computing resources that are dynamically provisioned on a self-service basis over the Internet or other data network 106, via web applications or web services, from an off-site third-party cloud service provider 101 who bills its clients on a utility computing basis, much like electricity usage is billed to public utilities customers. A "private cloud," on the other hand, is a shared infrastructure that may be established within an enterprise having various departments with similar requirements. Cloud computing may require storage of massive volumes of data called "cloud storage," which is a model of networked computer data storage for storing data on multiple virtual servers, generally hosted by third parties, rather than being hosted on dedicated servers. The data center operators "virtualize" resources according to the requirements of their customers and expose them as virtual servers, which the customers can themselves can manage. Physically, the resource may span across multiple servers or storage systems.

Cloud computing, in some embodiments, allows for dynamic placement of workload on dedicated or consolidated servers based on user-defined policies. Because of increased workloads, enterprises have to do a lot of capacity planning upfront to account for peak periods of activity, while at other times, resources may go underutilized. Cloud computing provides a way to avoid this problem of requiring such upfront capacity planning by using cloud resources, which essentially pushes the capacity planning to the cloud computing service providers. From a cloud service provider point of view, having multiple enterprises with differing peak capacity requirements allows for greater capacity planning and optimization because usage among disparate customers is generally amortized over time. The average of capacity peaks over many different enterprises in many cases only requires a finite number of resources. A pay-as-you-go solution that offers compute on demand is a good complement to dedicated and consolidated infrastructure (e.g., hypervisor) in the enterprise. Enterprises currently employ any combination of physical hardware and virtual hardware (e.g., hypervisors or VMs) resources to accomplish computing tasks or workloads.

Each cloud in a cloud computing environment has finite resources; so, if a particular cloud saturates the computational and storage resources of its virtualization infrastructure, it may not be able to satisfy further requests for service allocations. By bridging and managing resources among multiple clouds, hardware computational and storage resources can be managed and optimized across any number of systems or enterprises. This may introduce new business opportunities among cloud providers, but also raises many challenges such as cloud federation, data synchronization, security, interoperability, QoS, monitoring, and billing. Users can access and use these cloud services through a web browser or other network interface as if the services were a program installed locally on their own computer.

Figure 2:
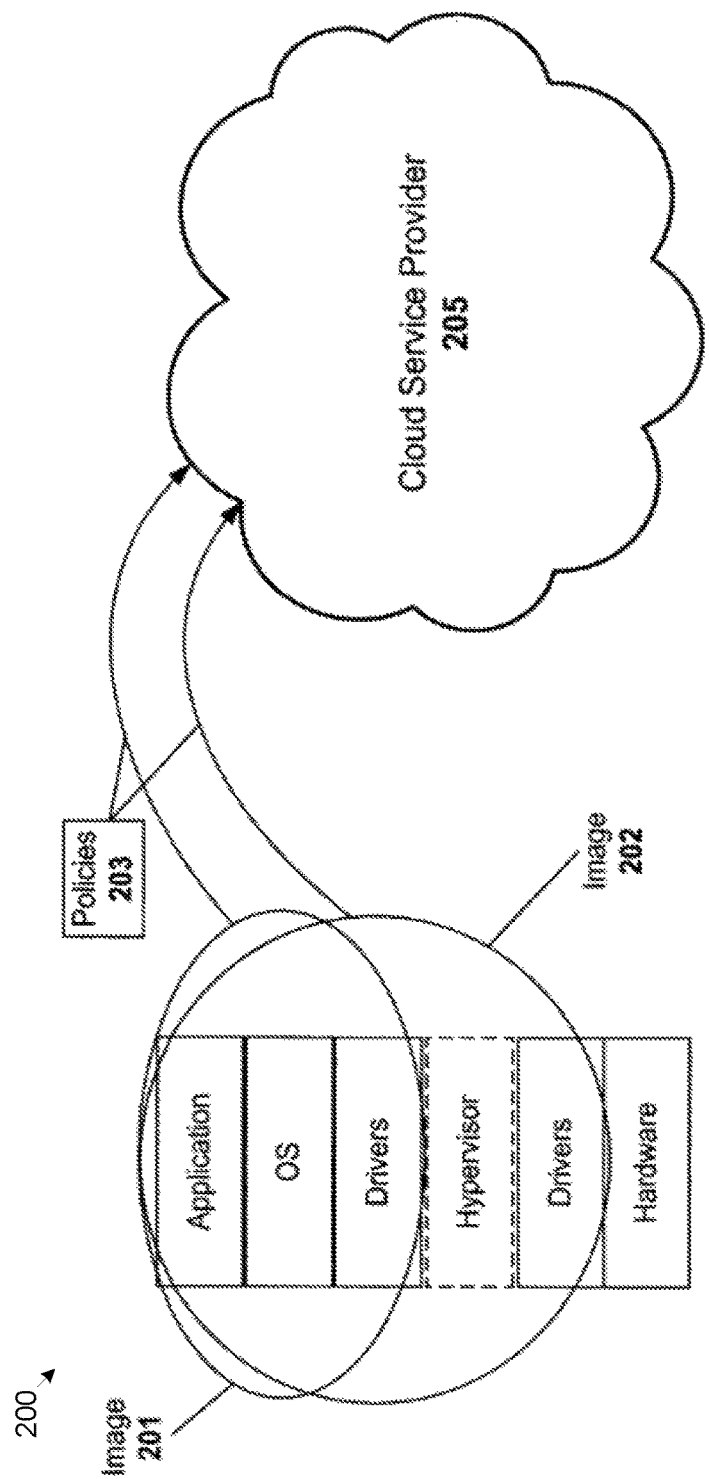
FIG. 2 is a schematic block diagram of one embodiment of another system for container synchronization.

To do this, workloads can be decoupled from the underlying hardware and placed in one or more clouds for processing. One technique by which workloads can be decoupled from the underlying system is to define a workload as an "image" (as shown in FIG. 2). An "image," as defined herein, includes an operating system ("OS"), and optionally its overlying application stack, but does not necessarily have a network identity such as a virtual MAC address or an IP Address. An image may have one or more unique identifiers, e.g., an image name, a universally unique identifier ("UUID"), or the like. An image may optionally include one or more network identifiers such as a virtual MAC address (e.g., in the context of an Ethernet Network), an IP address, or the like. The term "host image" can be used interchangeably with image. A host image may also have a unique identifier. A "cloud image" that has been uploaded into a cloud storage may include an operating system and optionally its overlying application stack.

A "system," as used herein, is defined as a hardware platform (virtual or real) capable of running an image. A system may consist of characteristics such as a processor, memory, and other peripherals. A system can be a bare metal server or a VM that exposes the same attributes as a bare metal server. As examples, a system can be identified by one of the MAC addresses of its network card, the address of its service processor, a name, a UUID, or the like. A "host," as defined herein, is any network addressable entity that is comprised of a host image running on a system, possibly within an enterprise environment. A host can be identified by an IP Address, host name, DNS host name, UUID, or the like. A "cloud host," as used herein, is a network addressable entity that is comprised of a cloud image running on a system in the cloud. The system in the cloud can be provisioned by the user at boot time. A cloud host can be identified using the path to its location in the cloud including, but not limited to, a DNS name or an IP address.

FIG. 2 depicts decoupling a workload (image) from its associated hardware system and placing it into a cloud of a particular cloud service provider. This can be accomplished by decoupling the images 201 and 202 from their underlying computing resources such that each image can be placed onto any of a multiplicity of platforms in a seamless manner, whether the platforms be other physical hardware systems (e.g. those having additional bandwidth), hypervisors, or various cloud service providers' platforms 205 as depicted in the illustrated embodiment 200. In addition, the source and destination computing resources may all be contained within an enterprise having one or more data centers within a private cloud such that data is migrated from data center to data center within the enterprise in a seamless manner. In one embodiment, an image may be configured with new capabilities such as network resources, file-system resources, and driver resources that are available to it, prior to migrating the image. The image can be configured when assigned or unassigned to a system. Metadata for the image may also be updated as part of the configuration process. Accordingly, images may be dynamically managed and provisioned based on system requirements.

As shown in FIG. 2, an image 201 can be defined to include an operating system and its associated application stack, as well as any associated drivers, settings (e.g., network settings, configuration settings, user settings, or the like), metadata, or the like stacked on top of the underlying hardware. An image 202 may also be defined to include one or more hypervisors and associated drivers. An image 201/202 can be defined and decoupled from its underlying hardware, and placed onto any other platform, including other physical systems or hypervisors, or into a public or private cloud for efficient use of processing resources. Not only can the image 201/202 be separated from the underlying hardware, but the image bits can also be separated from the metadata about the image 201/202 to enable broad image mobility functions among computing resources in a cloud computing environment.

An image 201/202 may be cloned before or after it is decoupled from its system and placed into one or more clouds, and, as described below, images on a host and in the cloud may be synchronized so that the data of each image is identical, or substantially identical. In addition, one or more policies 203 may also be uniquely defined for each image 201/202 placed in the cloud as shown in FIG. 2. These policies can be tied to various metrics that are important to the business of the customer of the cloud provider. The policies can be, for example, based on time of day, utilization rates, or the like. Images 201/202 can be migrated between physical machines, physical and virtual machines or hypervisors, physical machines and the cloud, virtual machines and the cloud, or any combination of these.

Figure 3:
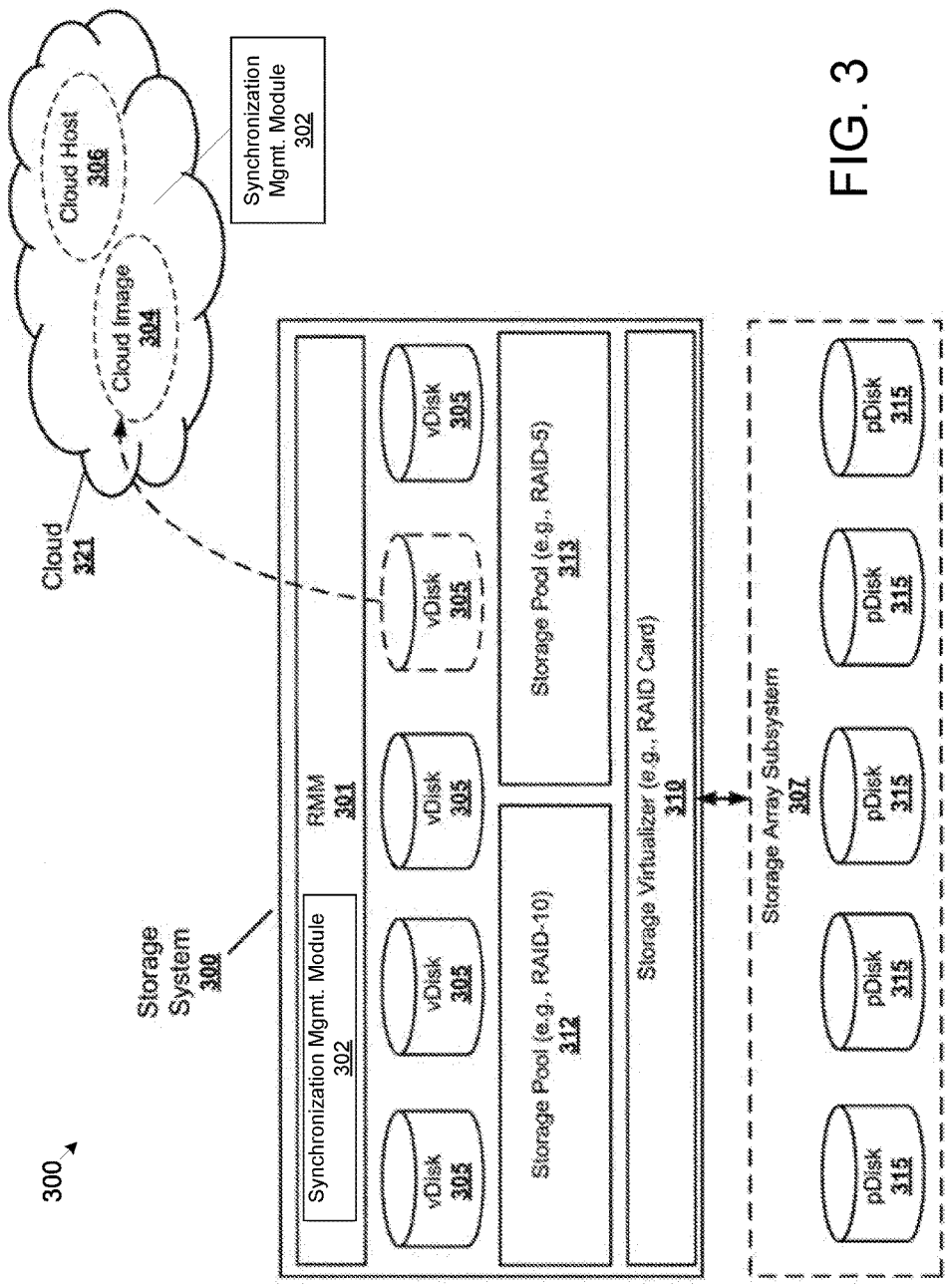
FIG. 3 is a schematic block diagram of one embodiment of yet another system for container synchronization.

FIG. 3 depicts an example embodiment of a system for container synchronization. In the illustrated embodiment, storage system 300 includes a remote management module ("RMM") 301 in communication with a number of virtual disks ("vDisks") 305 in a storage array. In one embodiment, the RMM 301 can include a Rackware Management Module having migration capabilities across physical, virtual, and cloud platforms developed by Rackware, Inc., Fremont, Calif. vDisks 305 each include a virtual disk of a certain capacity that is carved from one of storage pools 312 or 313. For example, vDisks 305 could be a 40 GB virtual disk created out of a RAID-5 storage pool 313 that has a total capacity of 400 GB. This means that the RAID-5 storage pool would have 360 GB left over which to create the other vDisks 305 in the pool. Each storage pool 312 and 313 comprises a storage virtualizer 310 in conjunction with physical disks ("pDisks") 315 that are present in the storage array subsystem 307. A storage pool 312 and 313 can have the attributes of RAID levels, as well as capacity and other access right policies that are enumerated and maintained by RMM 301. Each pDisk is a physical storage medium that is present in the storage array and can include any nonvolatile hardware storage resources such as conventional magnetic or optical disks, a SAS Drive, a SATA, flash or other solid state memory, or any combination of such devices. The RMM can group these pDisks as resources for a particular storage pool such as a RAID-10 Pool, RAID-5 pool, etc. as discussed above. A storage virtualizer 310 is typically a hardware acceleration device such as a RAID Card. The RAID Card is the main entity through which the storage pools are created out of the pDisks.

The RMM 301, in one embodiment, includes an embodiment of a synchronization management module 302. Similarly, one or more devices in the cloud environment 321 may include an instance of the synchronization management module 302. In one embodiment, the synchronization management module 302 is configured to synchronize host data associated with a first container on a host device with target data associated with a second container on a target device. In such an embodiment, the host device may be a local device, a device located on an organization's premises, or the like, and the target device may be a cloud device, a networked device, or the like.

In some embodiments, a container is an operating-system-level virtualization method for running multiple isolated systems (containers) on a control host using a single kernel or operating system (e.g., Linux, Windows, OSX, etc.). Containers provide operating system-level virtualization through a virtual environment that has its own process and network space while executing on the same host operating system that handles the hardware communication.

Images typically do not run by themselves. Instead, they usually interact in a tiered model running as part of the enterprise workload. For example, such a workload may include: (1) a web tier; (2) an application tier; and (3) a database tier. A web tier may present web pages to the user. The user interacts with the web pages that utilize the application tier. Then, once the user is ready to make a transaction, it will get recorded in the database tier. In addition, when an image is placed in the cloud, a container may be used to bundle these tiers as needed for the task to be accomplished. A container, as used herein, is a fully described set of images for a host operating system, and their relationships to each other. For example, a container may include files, folders, links, programs, registry settings, configuration files, user settings and data, databases, operating system settings and data, or the like that are self-contained for execution on an operating system in an operating system virtualization environment. Furthermore, a container may include files, data, settings, and/or the like for peripheral devices (e.g., printers, routers, or the like), network and storage infrastructure entities such as load balancers, firewall settings, subnets and virtual local area networks ("VLANs") settings, static routes, gateway router settings, networked storage settings, access control lists, domain name system ("DNS") settings, internet protocol settings, security settings, and/or the like. Performance operations can be applied to the entire container or to individual elements of the container. For example, a container may be used for a particular task requiring two web tiers, three application tiers, and a database tier. These can all be combined together into a container to perform the desired functionality.

Also a policy or group of policies can be associated with each container, just as they can be for individual images. When a container is defined, it can be placed into the cloud to perform the desired functionality, and the results can be tied back to the enterprise using a secure communications medium, such as, for example, a Virtual Private Networks ("VPNs"). Any secured communications medium can be used without departing from the principles underlying the various embodiments. Communications between customers and a particular cloud can be accomplished by message passing across one or more secure communication mediums. Additionally, a container can be split up across multiple service providers. As such, a container can span multiple clouds, which can be integrated together using one or more secure communications mediums.

In certain embodiments, the synchronization management module 302 determines one or more differences between the host data and the target data, and synchronizes the host data with the target data such that the target data is an identical, or substantially identical, copy of the host data. Target data may be substantially identical to host data if certain elements of the host data are not copied, such as operating system files, registry data, system settings, application settings, or the like. In one embodiment, however, the synchronization management module 302 creates an exact copy of a container, or more specifically, the host data within or associated with a container, on a target device, which may be used for disaster recovery, failover, backup, or the like. For example, if a container running on a host device becomes unavailable, the clients or other entities using the container may be re-directed to the synchronized container on the target device (fallback), or the synchronized container on the target device may copied to the host (disaster recovery).

Therefore, in one embodiment, the synchronization management module 302 provides an improvement to existing computing systems and technology by providing for the synchronization of an operating system container, which may be used for fallback or disaster recovery purposes, at a container level (e.g., synchronizing a full container and/or a portion of a container). Furthermore, as described in more detail below, various synchronization policies, synchronization settings, or the like, may be assigned or applied to a container, host data within the container, or the like, to provide custom synchronization to fit the needs of various users.

Figure 4:
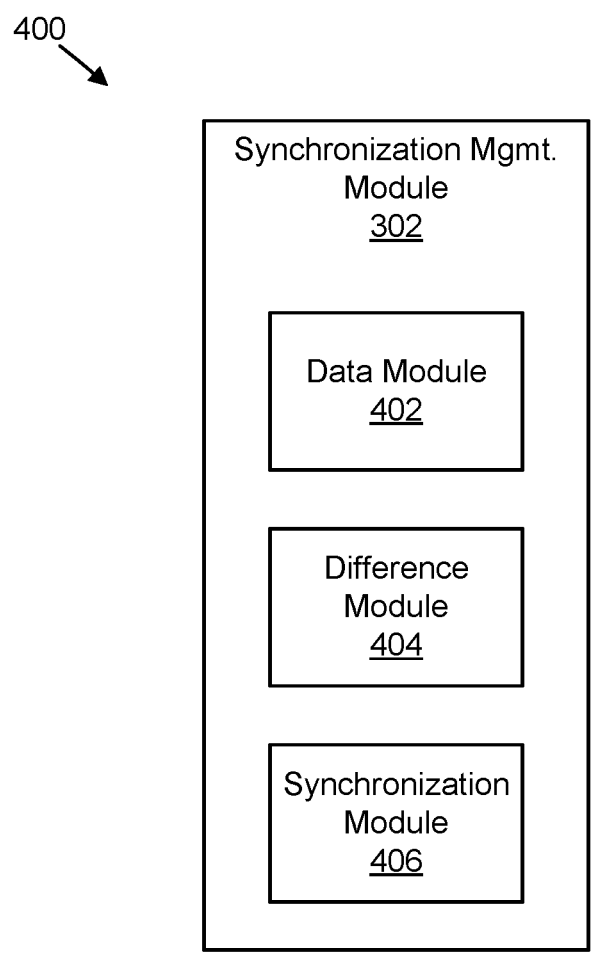
FIG. 4 is a schematic block diagram of one embodiment of a module for container synchronization.

FIG. 4 depicts one embodiment of a module 400 for container synchronization. In one embodiment, the module 400 includes an instance of a synchronization management module 302. The synchronization management module 302, in a further embodiment, includes one or more of a data module 402, a difference module 404, and a synchronization module 406, which are described in more detail below.

The data module 402, in one embodiment, determines host data associated with a host container on a host device. The host data, for example, may include operating system files, server files, networking files, applications, application-specific files, application settings, user settings, documents, configuration files, system settings, registry settings, database files, and/or the like. The host data is associated with a host container, in one embodiment, by being logically contained within the host container, linked to the host container, or otherwise associated with the host container. The host device, as described above may include a local information handling device 102, such as a local server, virtual machine, desktop computer, laptop computer, or the like.

The data module 402 may determine host data based on user input, according to one or more predefined settings, or the like. For example, a user, such as an IT administrator, may specify a specific container, or host data within the container, to synchronize to a target device, as described in more detail below. In another example embodiment, the data module 402 may determine host data associated with a host container based on a configuration file, a synchronization policy (described below), or the like, which may specify which host container to synchronize and/or which host data of the host container (via an inclusive and/or exclusive list) to synchronize to the target device. In a further embodiment, the data module 402 may scan, search, or otherwise find host containers executing on a host device to determine host data for each of the host containers.

The data module 402, in a further embodiment, determines target data associated with a target container on a target device. The target data may be a previously stored, replicated, synchronized, mirrored, or the like version of the host data associated with the host container, a portion of the host data associated with the host container, a different set of data associated with a different container, or the like. For example, the target data may be a previously stored version of a host container executing on the host device. In such an embodiment, the host container on the host device (e.g., the host container that includes the host data) may be assigned an identifier that corresponds to an identifier assigned to the target container on the target device (e.g., the target container that includes the target data). The target device, as described above, may include a remote device, such as a cloud server or virtual machine, or the like.

In certain embodiments, the data module 402 determines a plurality of target devices that may comprise target data associated with the host data of the host container. For example, the data module 402 may identify a plurality of remote and/or cloud servers that are used to store target data of target containers that are synchronized with host data of the host container. In this manner, the synchronization management module 302 can synchronize host data of a host container on a host device to multiple target devices, which may be useful for data redundancy, for failover and/or disaster recovery purposes, and/or the like.

The difference module 404, in one embodiment, determines one or more differences between the host data associated with the host container on the host device and the target data associated with the target container on the target device. In one embodiment, the difference module 404 determines whether there are any data differences between each element of the host data and the target data. For example, the difference module 404 may compare contents of each file of the host data with each file of the target data, blocks of data, sectors of data, bytes/bits of data, partitions, disks, or the like between the host and target data.

In a further embodiment, the difference module 404 compares a most recently synchronized/saved date of the target container with a most recently modified date of the host container to determine whether the host container includes any modifications that may not be reflected or present in the target container. In this manner, the difference module 404 can determine whether the host container, or more specifically the host data associated with the host container, includes changes, modifications, or the like that have not been synchronized with the target container and/or the target data associated with the target container.

The synchronization module 406, in one embodiment, synchronizes the host data associated with the host container on the host device with the target data associated with the target container on the target device in response to the difference module 404 determining differences between the host data and the target data. The synchronization module 406, for example, may copy, reproduce, replicate, or the like the modified host data of the host container to the target data of the target container such that the target container contains an identical copy of the host data of the host container.

In some embodiments, as described below, the synchronization module 406 synchronizes the host data of the host container with the target data of the target container according to one or more synchronization policies. The synchronization policies may specify a synchronization schedule, a synchronization frequency, specific host data (files, sectors, blocks, or the like) that should be synchronized or excluded from synchronization, or the like.

The synchronization module 406, in one embodiment, synchronizes the host data with the target data on a per file basis. For example, if the difference module 404 determines that a host data file has modifications that are not present in a corresponding target data file, the synchronization module 406 may copy the entire file over the file in the target container, may copy the modified portion of the host file to the target file, or the like. In certain embodiments, the synchronization module 406 synchronizes the host data with the target data on a per-block basis, a per-sector basis, a per-byte basis, a per-bit basis, and/or the like.

In one embodiment, if the synchronization module 406 determines that a host container and the host data within the host container has not previously been synchronized to the target device, the synchronization module 406 copies the entire host container, e.g., every host data element within the host container, to the target device as a container on the target device. In such an embodiment, when the synchronization module 406 performs subsequent synchronizations of the host container, the synchronization module 406 synchronizes the host container with the previously synchronized target container.

In certain embodiments, the synchronization relationship between the host container and the target container is a one-way synchronization relationship such that only changes or modifications of the host data in the host container are propagated to the target container on the target device, and not from the target container to the host container. For example, the target data of a target container may include changes or modifications as a result of various testing, experimental use, or the like. In such an embodiment, the synchronization module 406 does not propagate the target data modifications to the host data of the container that corresponds to the target container of the target data. The synchronization module 406 instead ignores the changes on the target data and only propagates the host data changes to the target data. In a further embodiment, the synchronization module 406 overwrites any changes on the target data that are not present in the host data during the synchronization so that the target data mirrors the host data (e.g., so that the target data does not include any changes or modifications that are not present in the host data). In some embodiments, the synchronization module 406 ignores any changes on the target data that are not present in the host data during the synchronization of the host data with the target data.

In a further embodiment, the synchronization relationship between the host container and the target container is a two-way synchronization relationship such that changes or modifications between the host data and the target data are maintained and propagated to each of the host and target data so that changes that are present on the target data are propagated to the host data and changes that are present on the host data are propagated to the target data. For example, if the target data has been changed by an external source, instead of disregarding or overwriting the changes made to the target data, the synchronization module 406 may propagate the changes made to the target data to the host data. In the event that there are conflicts between the changes on the host data and the target data, the synchronization module 406 may prompt a user for a selection of which data changes to keep and/or discard.

In some embodiments, the synchronization module 406 performs synchronous replication of the host container and/or host data to the target container and/or target data such that the synchronization module 406 propagates changes made to the host data/container to the target data/container in real-time, or in substantially real-time. For example, when a file in the host container is modified and saved, the synchronization module 406 may replicate the change to the corresponding file in the target container synchronously, or in real-time. In certain embodiments, the synchronization module 406 performs asynchronous replication of the host container/data to the target container/data such that the synchronization module 406 propagates changes made to the host container/data at a later period of time, e.g., according to a synchronization schedule, or the like, and not necessarily at the point when the changes are made/saved on the host device.

In one embodiment, the synchronization module 406 manages, maintains, creates, tracks, or the like one or more recovery points for synchronization operations. In certain embodiments, the synchronization module 406 maintains multiple lists, tables, databases, or the like for differing synchronization timeframes. For example, one list may track synchronization recovery points each hour for up to 12 hours. The synchronization module 406 may also track synchronization recovery points daily, weekly, monthly, yearly, or the like. In one embodiment, the synchronization module 406 pushes the recovery points of the synchronization operations to object storage, e.g., in the cloud and/or in another remote storage location, for long-term, lower cost storage.

Figure 5:
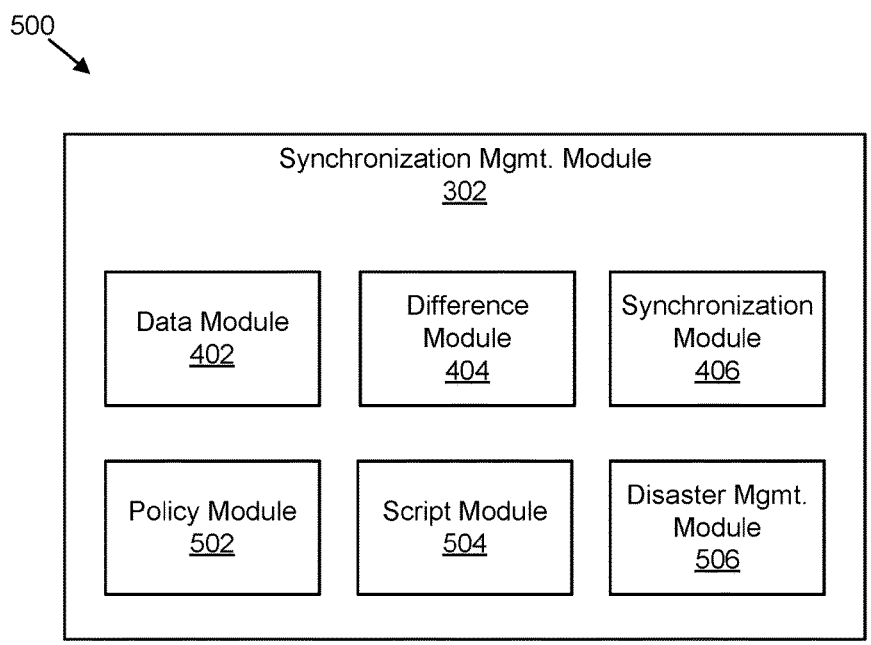
FIG. 5 is a schematic block diagram of one embodiment of another module for container synchronization.

FIG. 5 depicts one embodiment of a module 500 for synchronizing containers. In one embodiment, the module 500 includes an embodiment of a synchronization management module 302. The synchronization management module 302, in some embodiments, includes one or more of a data module 402, a difference module 404, and a synchronization module 406, which may be substantially similar to the data module 402, the difference module 404, and the synchronization module 406 described above. In a further embodiment, the synchronization management module 302 includes one or more of a policy module 502, a script module 504, and a disaster management module 506, which are described in more detail below.

The policy module 502, in one embodiment, determines one or more synchronization policies for a host container and/or a target container. As used herein, a synchronization policy defines one or more synchronization settings for a container. The one or more synchronization settings may include a synchronization frequency for the host data (e.g., in real-time, every thirty seconds, every ten minutes, every day, etc.), a synchronization schedule for the host data (e.g., synchronize every Sunday evening at 9:00 PM), one or more synchronization methods for the host data (e.g., synchronous or asynchronous), and one or more target devices to which the host data is synchronized. The policy module 502 may maintain a central repository of synchronization policies (e.g., stored on a central server, on the host device, or the like), may maintain a set of synchronization policies for each host container, or the like.

In one embodiment, the policy module 502 assigns a synchronization policy to a host container so that the synchronization settings of the synchronization policy are applied to all host data associated with the first container. For example, if a synchronization policy specifies that a host container be synchronized with a corresponding target container on a target device, the synchronization module 406 may synchronize each file within the host container with a corresponding file within the target container (or create a copy of the host file within the target container if there is not a corresponding file for the host file in the target container).

In one embodiment, the policy module 502 assigns a synchronization policy to specific host data within the host container such that the specific host data within the host container is synchronized according to the assigned synchronization policy. For example, the policy module 502 may assign a synchronization policy to a specific folder that contains a plurality of files and a different synchronization policy to a different folder that contains a plurality of different files. In this manner, the policy module 502 can assign different policies to different sets of host data within the host container.

In some embodiments, a synchronization policy may specify host data within a host container that should be excluded from being synchronized with the target data of the target container. For example, a synchronization policy assigned to a folder of a host container may specify that operating system-specific files (e.g., files with a specific extension) should not be synchronized with the target data within the target container. The policy may specify files of a specific type, files with a particular name, files containing keywords within a filename or the file's contents, files of a particular size, or the like that should not be synchronized with the target data of the target container.

In some embodiments, the policy module 502 assigns a plurality of synchronization policies to a host container and/or host data within the host container. For example, the policy module 502 may assign a synchronization policy to a host container, and various synchronization policies to specific host data (e.g., files or folders) within or otherwise associated with the host container. In such an embodiment, the policy module 502 may assign priorities to each of the policies. For example, the policy module 502 may assign a higher priority to a policy assigned to a host container than to a policy assigned to particular file or folder within the host container.

The synchronization module 406 may synchronize the host data within the host container with the target data of the target container responsive to a priority for each of the synchronization policies assigned to the host container and/or host data. For example, a synchronization policy assigned to the host container may specify that the host data within the host container be synchronized every five minutes, while a synchronization policy assigned to a particular folder within the host container may specify that the files within the folder be synchronized every minute. In such an embodiment, the synchronization policy assigned to the host container may have a higher priority than the synchronization policy assigned to the folder within the host container, but because there are no conflicting elements of the synchronization policies, the synchronization module 406 can synchronize the host data within the host container according to each synchronization policy.

In another example, a synchronization policy assigned to the host container may specify that files that are larger than 10 MB should not be synchronized to the target container. Another synchronization policy assigned to a folder within the host container may specify that files larger than 15 MB should not be synchronized to the target container. Assuming that the synchronization policy assigned to the host container has a higher priority than the synchronization policy assigned to the folder within the host container, if the synchronization module 406 attempts to synchronize a file within the folder that has a size of 13 MB, which is allowed by the synchronization policy assigned to the folder, the synchronization policy assigned to the host container will prevent the synchronization module 406 from synchronizing the file with a corresponding file within the target container. Thus, the synchronization module 406 may check for synchronization policies assigned to a host container and/or host data within the container to determine whether the host data within the host container should be synchronized according to the synchronization policies, when and how often the host data should be synchronized to the target container, and/or the like.

The script module 504, in one embodiment, executes one or more pre-synchronization scripts prior to the synchronization module 406 synchronizing the host data within the host container with the target data within the target container. In some embodiments, the pre-synchronization scripts may perform one or more functions such as data verification, locking files, folders, or other data so that it cannot be modified during the synchronization, policy verification, network connection and/or network reliability verification, target location verification, target container verification, target data verification, target device capacity, and/or the like. The script module 504 may execute a pre-script prior to an entire host container being synchronized and/or prior to individual data elements within the host container being synchronized.

The script module 504, in a further embodiment, executes one or more post-synchronization scripts after the synchronization module 406 synchronizes the host data within the host container with the target data within the target container. In one embodiment, the post-synchronization scripts may perform one or more functions such as data synchronization verification, releasing host data locks, terminating the connection to the target device, generating and presenting synchronization logs, cleansing (removing) management tools not needed on the target, and/or the like. The script module 504 may execute a post-script after an entire host container is synchronized and/or after individual data elements within the host container are synchronized.

The disaster management module 506, in one embodiment, prepares the target container on the target device for disaster recovery in the event that the host container on the host device become unavailable. In one embodiment, the disaster management module 506 reboots the target device in response to the synchronization module 406 synchronizing the host data with the target data of the target container. In this manner, the updated target data will be available for use immediately after the target device restarts, which may optimize the time to recovery in the event of a failure of the host container on the host device.

In some embodiments, the disaster management module 506 boots the target device into a microkernel instead of the installed operating system, which provides a faster data synchronization between the host device and the target device than if the operating system installed on the target device and/or one or more applications within the target container are executing. In the event of a failure of on the host container and/or host device, the target device can be rebooted into the installed operating system to service users previously connected to the failed host device/host container.

Figure 6:
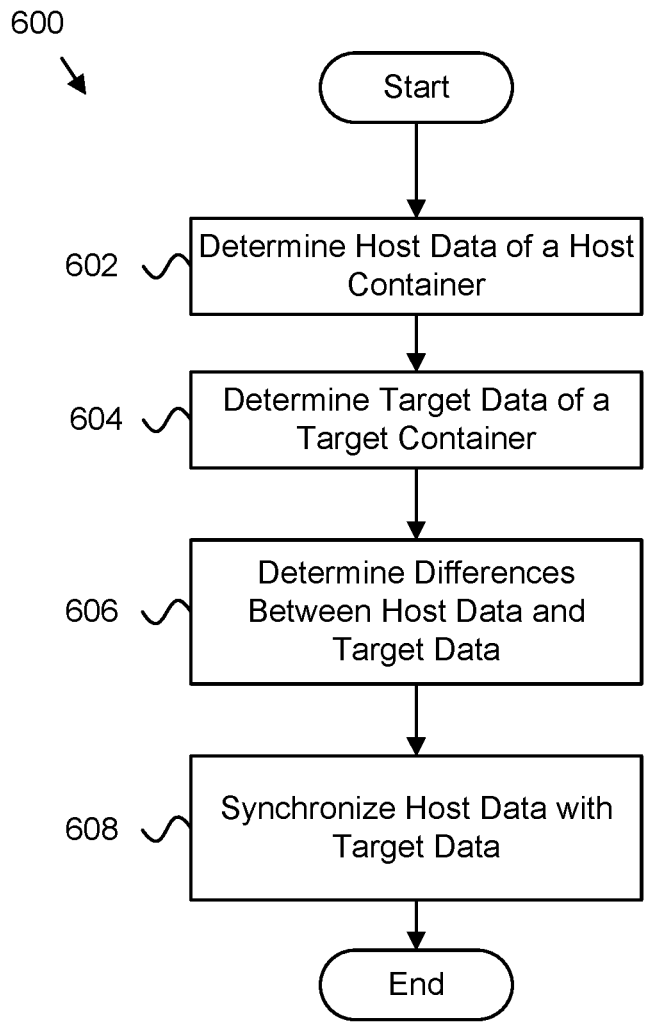
FIG. 6 is a schematic flow chart diagram of one embodiment of a method for container synchronization.

FIG. 6 is a schematic flow chart diagram illustrating one embodiment of a method 600 for container synchronization. In one embodiment, the method 600 begins and determines 602 host data of a host container for synchronization. The method 600 in a further embodiment, determines 604 target data of a target container associated with the host data of the host container. In some embodiments, the method 600 determines 606 differences between the host data associated with the host container and the target data associated with the target container. In a further embodiment, the method 600 synchronizes 608 the host data associated with the host container with the target data associated with the target container in response to determining 606 differences between the host data and the target data such that the host data associated with the host container is identical to the target data associated with the second container, and the method 600 ends. In some embodiments, the data module 402, the difference module 404, and the synchronization module 406 perform one or more steps of the method 600.

Figure 7:
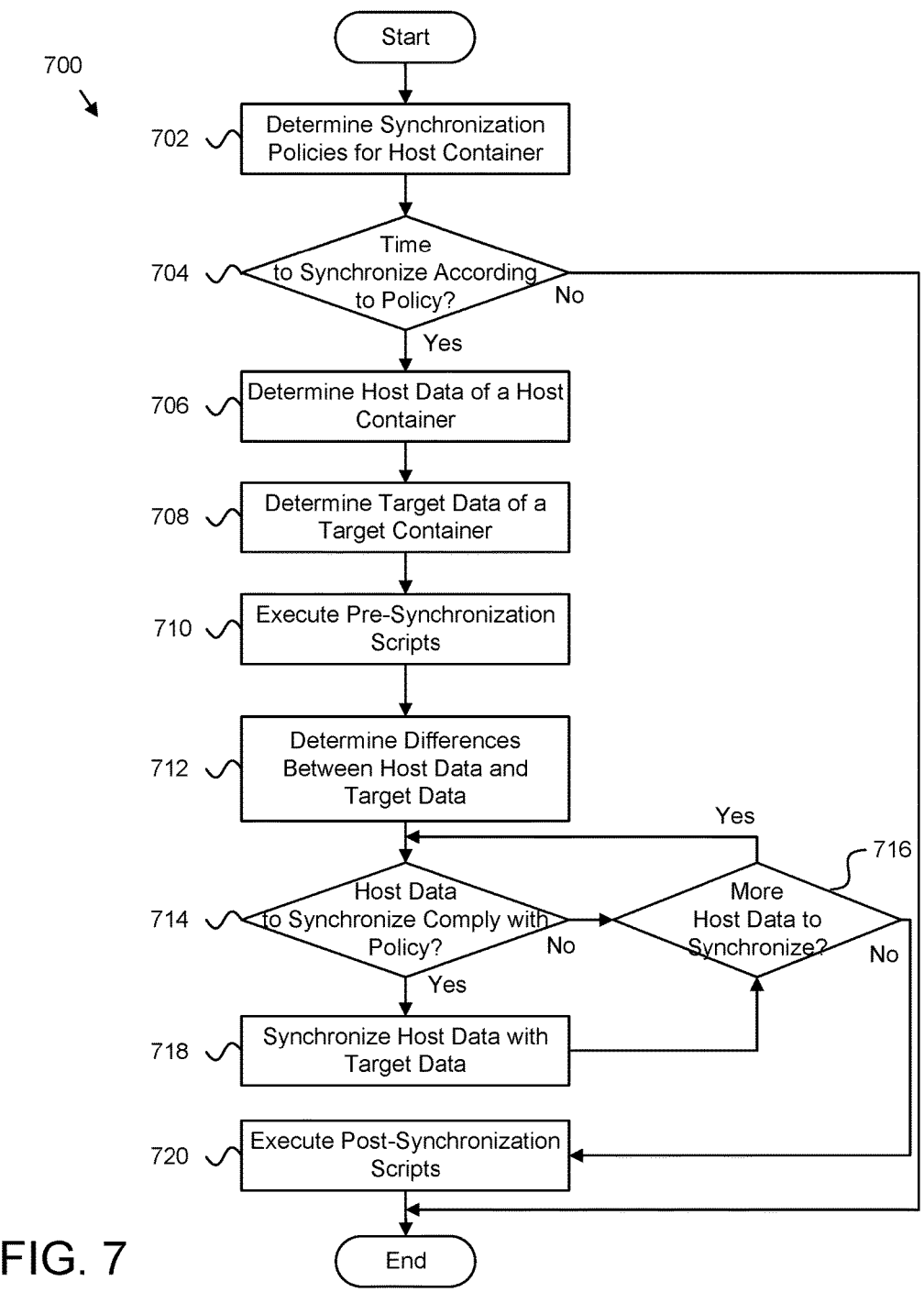
FIG. 7 is a schematic flow chart diagram of one embodiment of another method for container synchronization.

FIG. 7 is a schematic flow chart diagram illustrating one embodiment of a method 700 for container synchronization. In one embodiment, the method 700 begins and determines 702 one or more synchronization policies for a host container and/or host data within the host container. The method 700, in a further embodiment, determines 704 whether it is an appropriate time to synchronize the host data of the host container with the target data of the target container according to the synchronization policies. If not, the method 700 ends.

Otherwise, the method 700 determines 706 host data of a host container, and determines 708 target data of target container that corresponds to the host data of the host container. The method 700, in one embodiment, executes 710 one or more pre-synchronization scripts prior to synchronizing the host data with the target data. In some embodiments, the method 700 determines 712 differences between the host data and the target data. The method 700, in various embodiments, determines 714 whether host data to be synchronized, e.g., host data that includes changes not present in the target data, complies with one or more synchronization policies. If not, the method 700 determines 716 whether there is still host data to be synchronized and further determines 714 whether the host data to be synchronized complies with the synchronization policies.

Otherwise, if the method 700 determines 714 that the host data complies with the synchronization policy, the method 700 synchronizes 718 the host data with the target data. The method 700 determines 716 whether there is additional host data to be synchronized. If not, the method 700 executes 720 one or more post-synchronization scripts, and the method 700 ends. In some embodiments, the data module 402, the difference module 404, the synchronization module 406, the policy module 502 and the script module 504 perform one or more steps of the method 700.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   determining a first synchronization policy for a first container on a host device, the first container comprising a self-contained operating system virtualization container that is configured to isolate one or more applications and their data from one or more different applications executing in a different container on a same operating system as the first container;
   determining a second synchronization policy for host data associated with the first container on the host device, the first synchronization policy having priority over the second synchronization policy;
   in response to determining that the second synchronization policy for the first container does not conflict with the first synchronization policy:
      determining host data associated with a first container on a host device;
      determining target data associated with a second container on a target device, the second container comprising a self-contained operating system virtualization container that corresponds to the first container;
      determining differences between the host data associated with the first container on the host device and the target data associated with the second container on the target device; and
      synchronizing the host data associated with the first container on the host device with the target data associated with the second container on the target device according to the second synchronization policy in response to determining differences between the host data and the target data such that the host data associated with the first container is identical to the target data associated with the second container; and
   in response to determining that the second synchronization policy conflicts with the first synchronization policy, preventing synchronization of the host data associated with the first container on the host device with the target data associated with the second container on the target device according to the second synchronization policy.

2. The method of claim 1, further comprising determining one or more synchronization policies for the host data, wherein:
   a synchronization policy defines one or more synchronization settings for a container; and
   the one or more synchronization settings comprises one or more of a synchronization frequency for the host data, a synchronization schedule for the host data, one or more synchronization methods for the host data, and one or more target devices to which the host data is synchronized.

3. The method of claim 2, further comprising assigning a synchronization policy to the first container such that the one or more synchronization settings of the synchronization policy are applied to all host data associated with the first container.

4. The method of claim 2, further comprising assigning a synchronization policy to specific host data associated with the first container such that the specific host data associated with the first container is synchronized according to the assigned synchronization policy while different host data associated with the first container is synchronized according to a different synchronization policy.

5. The method of claim 2, wherein a synchronization policy specifies host data associated with the first container that is excluded from being synchronized with the target device.

6. The method of claim 2, further comprising assigning a plurality of synchronization policies to one or more of the first container and the host data associated with the first container.

7. The method of claim 6, further comprising:
determining a priority for each of the plurality of synchronization policies; and
synchronizing the host data associated with the first container responsive to the priority for each of the plurality of synchronization policies.

8. The method of claim 1, wherein the host data is synchronized with the target data in a one-way synchronization relationship such that data changes present in the target data, but not in the host data, are overridden by the host data such that the target data mirrors the host data.

9. The method of claim 1, further comprising rebooting the target device in response to the host data being synchronized with the target data.

10. The method of claim 1, wherein the target device executes a microkernel during synchronization of the host data with the target data.

11. The method of claim 1, further comprising synchronizing the host data with the target data in real-time.

12. The method of claim 1, wherein the host data associated with the first container comprises one or more of a file, a partition, a disk, a data block, a data sector, a byte, and a bit.

13. An apparatus, comprising:
a processor;
a memory that stores code executable by the processor to:
determine a first synchronization policy for a first container on a host device, the first container comprising a self-contained operating system virtualization container that is configured to isolate one or more applications and their data from one or more different applications executing in a different container on a same operating system as the first container;
determine a second synchronization policy for host data associated with the first container on the host device, the first synchronization policy having priority over the second synchronization policy;
in response to determining that the second synchronization policy for the first container does not conflict with the first synchronization policy:
determine host data associated with a first container on a host device;
determine target data associated with a second container on a target device, the second container comprising a self-contained operating system virtualization container that corresponds to the first container;
determine differences between the host data associated with the first container on the host device and the target data associated with the second container on the target device; and
synchronize the host data associated with the first container on the host device with the target data associated with the second container on the target device according to the second synchronization policy in response to determining differences between the host data and the target data such that the host data associated with the first container is identical to the target data associated with the second container; and
in response to determining that the second synchronization policy conflicts with the first synchronization policy, prevent synchronization of the host data associated with the first container on the host device with the target data associated with the second container on the target device according to the second synchronization policy.

14. The apparatus of claim 13, wherein the code is further executable by the processor to determine one or more synchronization policies for the host data, wherein:
a synchronization policy defines one or more synchronization settings for a container; and
the one or more synchronization settings comprises one or more of a synchronization frequency for the host data, a synchronization schedule for the host data, one or more synchronization methods for the host data, and one or more target devices to which the host data is synchronized.

15. The apparatus of claim 14, wherein the code is further executable by the processor to one or more of:
assign a synchronization policy to the first container such that the one or more synchronization settings of the synchronization policy are applied to all host data associated with the first container; and
assign a synchronization policy to specific host data associated with the first container such that the specific host data associated with the first container is synchronized according to the assigned synchronization policy while different host data associated with the first container is synchronized according to a different synchronization policy.

16. The apparatus of claim 14, wherein a synchronization policy specifies host data associated with the first container that is excluded from being synchronized with the target device.

17. The apparatus of claim 14, wherein the code is further executable by the processor to assign a plurality of synchronization policies to one or more of the first container and the host data associated with the first container.

18. The apparatus of claim 13, wherein the host data is synchronized with the target data in a one-way synchronization relationship such that data changes present in the target data, but not in the host data, are overridden by the host data such that the target data mirrors the host data.

19. The apparatus of claim 13, wherein the code is further executable by the processor to synchronize the host data with the target data in real-time.

20. A program product comprising a non-transitory computer readable storage medium that stores code executable by a processor, the executable code comprising code to perform:
determining a first synchronization policy for a first container on a host device, the first container comprising a self-contained operating system virtualization container that is configured to isolate one or more applications and their data from one or more different applications executing in a different container on a same operating system as the first container;
determining a second synchronization policy for host data associated with the first container on the host device, the first synchronization policy having priority over the second synchronization policy;

in response to determining that the second synchronization policy for the first container does not conflict with the first synchronization policy:
  determining host data associated with a first container on a host device;
  determining target data associated with a second container on a target device, the second container comprising a self-contained operating system virtualization container that corresponds to the first container;
  determining differences between the host data associated with the first container on the host device and the target data associated with the second container on the target device; and
  synchronizing the host data associated with the first container on the host device with the target data associated with the second container on the target device according to the second synchronization policy in response to determining differences between the host data and the target data such that the host data associated with the first container is identical to the target data associated with the second container; and
in response to determining that the second synchronization policy conflicts with the first synchronization policy, preventing synchronization of the host data associated with the first container on the host device with the target data associated with the second container on the target device according to the second synchronization policy.

\* \* \* \* \*